United States Patent Office 2,811,510

Patented Oct. 29, 1957

2,811,510

LIGHT-SENSITIVE POLYMERIC STILBAZOLES AND QUATERNARY SALTS THEREOF

Gerhard W. Leubner, Jack L. R. Williams, and Cornelius C. Unruh, Rochester, N. Y., assignors to Eastman Kodak Company, Rochester, N. Y., a corporation of New Jersey No Drawing. Application September 15, 1955, Serial No. 534,598

12 Claims. (Cl. 260—67.5)

This invention relates to polymeric C-vinylpyridines, and more particularly to the quaternary salts thereof, and to a process for their preparation.

It is known that when an aldehyde, particularly an aromatic aldehyde, is condensed with a compound containing an active methyl or methylene group, there is obtained a structure which when present in a resinous polymer renders such a polymer sensitive to light. This sensitivity is manifested by insolubilization of a soluble coating of the polymer on exposure to a light of a suitable wave-length usually in the ultraviolet region of the spectrum. By exposing under an appropriate negative and developing with a material which is a solvent for the unexposed area of the coating, a resist type of relief image is obtained. These are of considerable value in various photographic processes as in photomechanical reproductions. While most of the light-sensitive polymers of this kind are carbocyclic, light-sensitive polymers containing heterocyclic nuclei are also known. For example, in copending application Serial No. 397,706, filed December 11, 1953, in the name of Jack L. R. Williams, now abandoned, there are described light-sensitive poly-N-vinylpyridine quaternary salts and aromatic aldehyde condensation products of those resins containing an active methyl group on the pyridyl nucleus. However, these resinous products are derived from polyvinyl sulfonates containing residual vinyl alcohol units, and further the reactions with pyridine are generally incomplete giving rise to light-sensitive products comprising at least two, or more, different units of varying proportions. Reproducibility of uniform products and the obtaining of correspondingly good photomechanical reproduction results with these materials is, therefore, difficult to accomplish.

We have now found that polyvinylpyridine quaternary salts containing an active methyl group, i. e. a methyl group ortho and/or para to the heterocyclic nitrogen atom of the pyridyl nucleus, can be condensed with an aromatic aldehyde to give light-sensitive resinous products of very high sensitivity not only in the ultraviolet region but over practically the whole of the visible spectrum, of uniform and readily reproducible compositions, and of good solubility in common organic solvents but becoming insoluble on short exposures to natural and artificial daylight light sources, which on coating from a suitable solvent, exposing under suitable negative material and developing out the soluble, unexposed coating areas give hard and tough, and in some cases ink-receptive, images. When such coatings and images are prepared on a suitable support material, they may also be employed as printing plates. Many of our resinous products are water-soluble and, accordingly, can be advantageously processed by aqueous processing techniques. For still further uses, reference may be had to copending application Serial No. 534,599, of Earl M. Robertson, filed of even date herewith, wherein a reproduction process is described and claimed.

It is, accordingly, an object of our invention to provide a new class of resinous products which have a high sensitivity to light, in both the ultraviolet and visible regions of the spectrum. Another object is to provide resinous products as above which are soluble in common solvents, but which become insoluble on exposure to light of the said regions of the spectrum. Another object is to provide a process for preparing the said light-sensitive, resinous products. Other objects will become apparent hereinafter.

In accordance with our process, we prepare the light-sensitive resinous products of our invention by several processes (1) wherein the monomeric C-vinylpyridine containing an active methyl group ortho or para to the heterocyclic nitrogen atom is first polymerized alone or together with another polymerizable monomer and then quaternized, followed by condensation with the aromatic aldehyde, in the presence of a basic compound such as piperidine or piperidinium ion or (2) wherein the quaternary salt of the C-vinylpyridine containing an active methyl group ortho or para to the heterocyclic nitrogen atom is first prepared and this is then polymerized alone or together with another polymerizable monomer, followed by condensation with the aromatic aldehyde similarly in the presence of the basic compound or (3) wherein the said vinylpyridine compound is simultaneously quaternized and homopolymerized or copolymerized, followed by condensation with the aromatic aldehyde in the presence of the basic compound. Those of the light-sensitive products prepared with the various benzaldehydes may properly be termed "stilbazole" derivatives. The process designated (3) above is preferred but in any of these processes the preferred light-sensitive resinous products obtained may be represented, depending on the starting vinylpyridine compound, by one or other of the following recurring structural units:

(I)

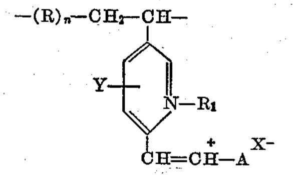

(II)

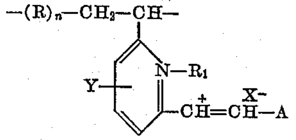

(III)

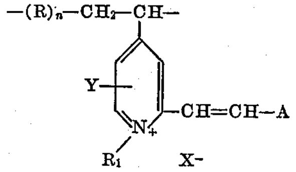

wherein $n$ represents a digit of from 0 to 50, or higher, i. e. the recurring structural unit may represent a homopolymer or a copolymer wherein the molar ratios are up to 1:50 of the vinylpyridyl group to the comonomer group R, Y represents a hydrogen atom or an alkyl group containing from 1 to 2 carbon atoms, i. e. a methyl or ethyl group, $R_1$ represents an alkyl group containing from 1 to 6 carbon atoms, e. g. methyl, ethyl, propyl, isopropyl, hexyl, etc. groups, X represents an anion such as an alkylsulfonic acid radical containing from 1 to 6 carbon atoms or an arylsulfonic acid radical containing from 6 to 7 carbon atoms (i. e. an alkyl or arylsulfonate anion) e. g. a methanesulfonate anion, a butanesulfonate anion, a benzenesulfonate anion, a p-toluenesulfonate anion, etc., an alkylsulfuric acid radical containing from 1 to 6 carbon atoms (i. e. an alkylsulfate anion) e. g. a methylsulfate anion, an ethylsulfate anion, a butylsulfate anion, a hexylsulfate anion, etc., a halide anion, e. g. an iodide anion, a chloride anion, a bromide anion, or other acid radical (anion), for example, a perchlorate anion, etc., R represents a comonomer unit such as derived from an ethylenically unsaturated, polymerizable monomer containing the basic aliphatic —CH=C< group, for example, such as unreacted C-vinylpyridine quaternary salt units or ethylene, isobutylene, 1,3-butadiene, etc. units, a vinyl ester unit containing from 2 to 7 carbon atoms in the ester radical, e. g. vinyl acetate, vinyl butyrate, vinyl benzoate, etc. units, a corresponding isopropenyl ester unit, a styrene, alkylstyrene or chlorostyrene unit, an alkyl acrylate or methacrylate unit, a vinyl alkyl ether unit, a vinyl alkyl ketone unit, an acrylic amide unit such as acrylamide, methacrylamide, N-alkyl and N,N-dialkyl acrylamide and methacrylamide, etc. units, a vinyl or vinylidene chloride unit, a vinyl pyridine or quaternized vinyl pyridine unit, and the like units, wherein in each instance the said alkyl group contains from 1 to 4 carbon atoms, and A represents a heterocyclic group, for example, a furyl group or a carbocyclic group of from 6 to 14 carbon atoms such as a phenyl, naphthyl or anthryl nucleus which may or may not be substituted by at least one monovalent substituent but more specifically A may be represented by the following general structure:

(IV)

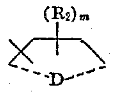

wherein *m* represents a digit of from 1 to 2, $R_2$ represents a hydrogen atom or a monovalent substituent such as a halogen atom, e. g. chlorine or bromine, a methylene dioxy group, a cyano group, a nitro group, an alkyl group of from 1 to 4 carbon atoms, a hydroxyl group, an alkoxy group of from 1 to 4 carbon atoms, e. g. methoxy, ethoxy, propoxy, isopropoxy, etc. groups, an acetamido group, a $—COOR_3$ group wherein $R_3$ represents a hydrogen atom, an alkyl group of from 1 to 4 carbon atoms or an alkali metal atom, e. g. sodium or potassium, an $—SO_3R_3$ group wherein $R_3$ is as above and an

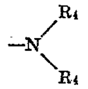

group wherein $R_4$ represents an alkyl group of from 1 to 4 carbon atoms, and D represents the atoms necessary to complete a phenyl nucleus, a naphthyl nucleus or an anthryl nucleus. Of the above-defined light-sensitive products, those wherein D represents the atoms necessary to complete a phenyl nucleus, i. e. those prepared with the various benzaldehydes, are preferred. It will be understood that the respective reactions need not go to completion, in which case there would also be present a third component, namely, the quaternized vinylmethylpyridine unit.

In the above described processes, the polymerizations may be carried out in mass, in solution or in suspension in a nonsolvent usually in the presence of a peroxide polymerization catalyst such as hydrogen peroxide, benzoyl peroxide, acetyl peroxide, ammonium persulfate, potassium persulfate, etc. Where the polymerizations are carried out in solution as in the homopolymerization of vinylpyridine quaternary salts the water-soluble polymerization catalysts are preferred. An activating agent such as an alkali metal bisulfite may be employed. Also, for suspension polymerizations an emulsifying agent such as an alkali metal salt of an alkyl acid sulfate, e. g. sodium lauryl sulfate may be used with advantage. Where the polymerization is carried out simultaneously with the quaternization under heated conditions, as with dimethyl sulfate, the reaction mixture need not contain a polymerization catalyst to obtain the polymeric and quaternized product. The polymerization temperatures of the processes set forth in the preceding may advantageously vary from about 30° to 100° C., preferably from 30° to 70° C. The mentioned copolymers may contain any proportion of the particular comonomer, but preferably the molar ratio is from 1:5 of the vinylpyridine compound or of the quaternary salt thereof to from 5:1 of the comonomeric compound. Typical copolymers include those wherein the comonomer is, for example, a vinyl or isopropenyl ester such as vinyl acetate, vinyl butyrate, isopropenyl acetate, etc., a vinyl alkyl ether or ketone such as vinyl methyl ether, vinyl methyl ketone, etc., acrylic and methacrylic acids, their anhydrides and alkyl esters, nitriles, amides and N-alkyl substituted amides thereof such as methyl acrylate, methyl methacrylate, acrylonitrile, methacrylonitrile, acrylamide, methacrylamide, N-methyl acrylamide, N,N-dimethyl acrylamide, N-methyl methacrylamide, etc., 2- or 4-vinylpyridines and quaternary salts thereof, styrene, alkylstyrenes, chlorostyrenes, vinyl chloride, vinylidene chloride, maleic anhydride, maleic and fumaric acids and their alkyl esters, nitriles, amides and N-alkyl substituted amides wherein in each instance the said alkyl group contains from 1 to 4 carbon atoms, and the like copolymers. In many instances, the copolymers contain about the same proportions of the components as were present in the starting polymerization mixtures.

For the quaternization reactions the quaternizing reagent is employed in proportions equimolar or slightly in excess of the amount required to react with all of the vinylpyridine monomer or polymer to be quaternized. The temperature varies somewhat depending on whether the vinylpyridine monomer or the polymer is being quaternized, but in each case the reaction is completed at elevated temperatures. Advantageously, the reaction is carried out in an inert solvent medium such as acetone, methanol, etc. For the condensation of the quaternized vinylpyridine polymer with the aromatic aldehyde to form the polymeric stilbazoles of our invention, the reaction is customarily carried out in the dark at a temperature from about 15° to 40° C., preferably 20° to 30° C., in an alkanol solvent in which the polymer is soluble such as methanol, ethanol, etc., in the proportions of from about 1 to 40, or even more, moles of the aromatic aldehyde to each mole unit of the said polymer. The condensation reaction may or may not go substantially to completion; if the reaction is complete, then practically all of the active methyl groups enter the reaction so that essentially each pyridyl nucleus has attached thereto the said —CH=CH—A grouping, the product being then separated from the reaction mixture by any of the conventional means of separation, but readily by precipitation in ether, washing and drying. Where the reactants are employed in about equimolar proportions, and too high a purity of product is not needed, the product can be used directly without separation by simply adding a more active solvent to the completed reaction mixture and filtering out any unwanted residues. However, the separated and dried product is preferred and this may then be dissolved in an appropriate solvent such as an alkanol, 2-methoxyalkanol, etc., and the solution then coated on a suitable support, the cured coating exposed to a suitable subject such as a negative and developed to a stable, tough, good definition image with the same or similar solvent. However, other valuable light-sensitive products are also obtained where the condensations with the aromatic aldehydes are carried only to partial completion. In general, as the proportion of condensed groups (light-sensitive groups) decreases the sensitivity likewise decreases, but the solubility, for example, in water increases.

Suitable intermediate monomeric vinylpyridines for practicing our invention include the monomethyl substituted vinylpyridines such as 2-methyl-4-vinylpyridine, 2-methyl-5-vinylpyridine, 2-methyl-3-vinylpyridine, 2-methyl-6-vinylpyridine and the dimethyl substituted vinylpyridines such as 2,6-dimethyl-4-vinylpyridine, 2,5-dimethyl-4-vinylpyridine, 2,3-, 2,4-, 2,6-, 3,6- and 4,6-dimethyl-5-vinylpyridines and 2,3- and 2,4-dimethyl-6-vinylpyridines and the corresponding quaternary salts prepared with the compound $R_1X$ previously defined such as the quaternary salts with alkyl- and aryl-sulfonic acid alkyl esters, alkyl sulfates or alkyl halides, e. g. methyl methane sulfonate, methyl benzenesulfonate, methyl p-toluenesulfonate, ethyl p-toluenesulfonate, dimethyl sulfate, diethyl sulfate, dibutyl sulfate, methyl iodide, methyl chloride, methyl bromide, ethyl iodide, ethyl bromide, n-propyl bromide, n-butyl bromide, etc. The compounds 2-methyl-5-vinylpyridine and 1,2-dimethyl-5-vinylpyridinium methosulfate are the preferred intermediates.

Suitable intermediate aromatic aldehydes for condensing with the polymeric vinylpyridine quaternary salts to form the light-sensitive polymeric stilbazoles of the invention may be represented by the following general formula:

(V)

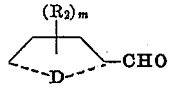

wherein $m$, $R_2$ and D are as previously defined. The benzaldehydes are preferred. Typical aromatic aldehydes coming within the above formula include benzaldehyde, o-, m- and p-chlorobenzaldehydes and bromobenzaldehydes, mono- and di-alkyl substituted benzaldehydes such as o-, m- and p-tolualdehydes and corresponding ethyl-, propyl- and butyl-benzaldehydes, 2,4-dimethylbenzaldehyde, 2,5-dimethylbenzaldehyde, etc., alkoxyl group substituted benzaldehydes such as o-, m- and p-methoxybenzaldehydes, p-ethoxybenzaldehyde, 3,4-diethoxybenzaldehyde, etc., the mono- and di-hydroxybenzaldehydes such as p-hydroxybenzaldehyde, 2,4-dihydroxybenzaldehyde, etc., vanillin, isovanillin, piperonal, the carboxybenzaldehydes such as o-carboxybenzaldehyde, p-carboxybenzaldehyde, etc. and the sodium and potassium salts thereof, the sulfo-benzaldehydes such as benzaldehyde-o-(m- or p-)sulphonic acids and the sodium and potassium salts thereof, the nitrobenzaldehydes such as p-nitrobenzaldehyde, etc., acylaminobenzaldehydes such as p-acetaminobenzaldehyde, etc., the N-alkyl substituted aminobenzaldehydes such as p-dimethyl- and p-diethylaminobenzaldehydes, etc., the cyanobenzaldehydes such as p-cyanobenzaldehyde, etc., the naphthaldehydes such as 1-naphthaldehyde, 2-naphthaldehyde, 1,8-naphthaldehydic acid, etc., the anthraldehydes such as 9-anthraldehyde, and the like. Other suitable aldehydes that may be employed include furfuraldehydes, cinnamaldehyde, azidobenzaldehydes such as 3-azidobenzaldehyde, thenaldehyde, 2-, 3-, and 4-pyridine aldehydes, and the like.

The invention is illustrated further by the following examples of certain preferred embodiments thereof.

*Example 1.—Preparation of quaternary monomer*

To a solution of 600 g. (5 moles) of freshly distilled 2-methyl-5-vinylpyridine and 1800 g. of acetone in a suitable container fitted with a stirrer, condenser, and dropping funnel was added 700 g. (5.6 moles) of freshly distilled dimethyl sulfate. The reaction mixture was kept cold in an ice-water bath during the addition (15–20° C.); toward the end of the addition the temperature was allowed to rise to 34°–40° C. The heavy white crystalline sludge was allowed to stand for ½ hour and was then filtered off and rinsed with a little acetone.

The crude quaternary salt was rapidly dissolved in about 2 l. of boiling ethanol, then rapidly cooled in an ice-water bath. The white, crystalline product was filtered off, washed with a little cold alcohol, and dried in vacuo. The yield of pure quaternary salt was about 1 kg. The product was 1,2-dimethyl-5-vinyl pyridinium methosulfate having the structural formula:

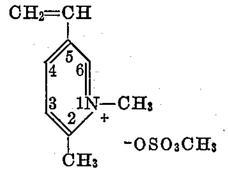

In place of the dimethyl sulfate, there may be substituted in the above example an equivalent of any of the mentioned quaternizing reagents such as methyl-p-toluenesulfonate, diethyl sulfate, methyl iodide, ethyl bromide, ethyl chloride, etc. to give the corresponding quaternary salts of the 2-methyl-5-vinylpyridine. Also, in place of the said vinylpyridine compound, there may be substituted in the above example an equivalent amount of any of the mentioned vinylpyridines containing a methyl group adjacent to the heterocyclic nitrogen atom, for example, 2-methyl-6-vinylpyridine, 2,4-dimethyl-6-vinylpyridine, etc. to give generally similar quaternary salts.

*Example 2.—Polymerization of the quaternary monomer*

To a solution of 40 g. of monomeric 1,2-dimethyl-5-vinylpyridinium methosulfate in 120 cc. of distilled water was added 1.0 cc. of 30% hydrogen peroxide. The solution was kept in a 60° C. bath overnight and the resulting viscous solution was diluted with an equal volume of methanol. This was poured into about 7 l. of agitated acetone, and the white fibrous polymer was leached in fresh acetone, then dried in a vacuum desiccator. The yield was 38 g. of poly-1,2-dimethyl-5-vinylpyridinium methosulfate.

By substituting for the 1,2-dimethyl-5-vinylpyridinium methosulfate in the above example with any other of the mentioned quaternary salts prepared in Example 1, there may be obtained the corresponding homopolymers.

*Example 3.—Simultaneous quaternization and polymerization of 2-methyl-5-vinylpyridine*

To a solution of 11.9 g. (0.1 mole) of 2-methyl-5-vinyl pyridine in 75 cc. of a 95% chloroform-5% methanol mixture were added 14.0 g. (0.111 mole) of redistilled dimethyl sulfate. Very soon after mixing a short spontaneous reaction started. The solution was then refluxed for 24 hours. The resulting mixture of dope and deposited gum was dissolved in 175 cc. of methanol and precipitated into approximately 2 l. of acetone. The product was washed several times with acetone and dried in a 40° C. oven. A yield of 19.5 g. (80%) polymeric salt was obtained. Analysis of this product showed that it contained 5.5% by weight of nitrogen as compared with calculated for $C_{10}H_{15}NO_4S$ unit of 5.7% of nitrogen. Accordingly, the product consisted of the recurring 1,2-dimethyl-5-vinylpyridinium methosulfate structural unit:

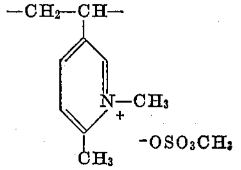

It had an inherent viscosity in methanol of 6.8.

In place of the 2-methyl-5-pyridine, there may be substituted in the above example an equivalent amount of any of the mentioned suitable vinylpyridines such as, for example, 2-methyl-6-vinylpyridine, 2-methyl-3-vinylpyridine, 2,3-, 2,4-, 2,6-, 3,6- or 4,6-dimethyl-5-vinylpyridines, etc. to give the corresponding quaternized polymers. Also the process of the above example may be employed for preparing the various mentioned copolymers by incorporating in the starting reaction mixture an appropriate amount of the desired comonomer, for example, styrene to give a copolymer of styrene and the quaternized vinylpyridine, or methyl acrylate to give a copolymer of methyl acrylate and the quaternized vinylpyridine, etc.

*Example 4.—Condensation of poly-1,2-dimethyl-5-vinylpyridinium methosulfate with anisaldehyde*

To a solution of 5.0 g. of poly-1,2-dimethyl-5-vinylpyridinium methosulfate in 20 cc. of methanol was added 25 cc. of anisaldehyde. One cc. of piperidine was added and the solution soon became dark red in color. Six hours later another cc. of piperidine was added and the solution allowed to stand in the dark at room temperature.

After three days the above solution was clear and bright yellow. The solution was thinned with methanol and poured into a large volume of ether. The yellow fibrous polymer was leached in fresh ether containing a trace of acetic acid, then was washed well with ether and dried. The polymer was soluble in methanol and 2-methoxyethanol. It was insoluble in water but became soluble, if a small amount of 2-methoxyethanol was added to the water. It consisted essentially of the recurring 4'-methoxy - 1 - methyl-5-vinyl-2-stilbazolium methosulfate structural unit:

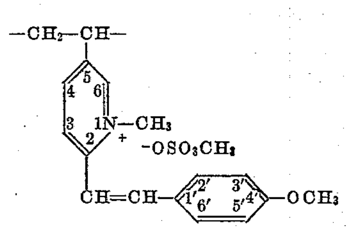

A 2% solution of the above polymer in 2-methoxyethanol was coated upon a paper lithographic printing plate using a "whirler" at 78 R. P. M. The dried coating was exposed under a photographic line negative for 15 seconds to a so-called "sun lamp," which radiates light equivalent to sunlight, placed 10 inches away. The exposed coating was developed in 2-methoxyethanol for 2 minutes and dried. A wet cotton swab containing some black lithographic ink was rubber over the surface and a black positive image corresponding to that of the negative was formed.

In place of the poly-1,2-dimethyl-5-vinylpyridinium methosulfate, there may be employed in the above example an equivalent amount of any other of the mentioned polymeric quaternary salts, for example, poly-1,2-dimethyl-6-vinylpyridinium methosulfate, or poly-1,2,4-trimethyl-6-vinylpyridinium methosulfate, or poly-1,2-dimethyl-5-vinylpyridinium bromide, or poly-1,2-dimethyl-5-vinylpyridinium p-toluenesulfonate, etc. to give generally similar light-sensitive stilbazoles.

*Example 5.—Condensation of poly-1,2-dimethyl-5-vinylpyridinium methosulfate with benzaldehyde*

Ten grams of poly-1,2-dimethyl-5-vinylpyridinium methosulfate was dissolved in a mixture of 25 cc. of methanol and 40 g. of benzaldehyde. Four cc. piperidine were added to the solution and two hours later another two cc. were added. After standing in the dark for three days, 5 cc. of acetic acid were added and then the solution was diluted with an equal volume of ether. The pale-yellow precipitate was washed well with ether and dried in the dark. The polymer contained 4.8% of nitrogen and 7.9% of sulfur. The polymer was a copolymer of 1,2-dimethyl-5-vinylpyridinium methosulfate and 1-methyl-5-vinyl-2-stilbazolium methosulfate, i. e. the final product still contained some unreacted 1,2-dimethyl-5-vinylpyridinium methosulfate units.

A coating of this polymer on a paper lithographic printing plate was exposed through a photographic line negative for one minute to a "sun lamp" and then developed for two minutes in 2-methoxyethanol. The developed image was inked to give a positive image corresponding to that on the negative.

By substituting for the poly-1,2-dimethyl-5-vinylpyridinium methosulfate in the above example an equivalent amount of any other of the mentioned polymeric quaternary salts, for example, poly-1,2-dimethyl-6-vinylpyridinium methosulfate, or poly-1,2,4-trimethyl-6-vinylpyridinium methosulfate, or poly-1,2-dimethyl-5-vinylpyridinium bromide, or poly-1,2-dimethyl-5-vinylpyridinium p-toluenesulfonate, etc., there may be prepared generally similar light-sensitive stilbazoles that are highly useful for preparing lithographic printing plates.

*Example 6.—Condensation of poly-1,2-dimethyl-5-vinylpyridinium methosulfate with 1-naphthaldehyde*

Ten grams of poly-1,2-dimethyl-5-vinylpyridinium methosulfate were dissolved in 40 cc. of methanol and 50 g. of 1-naphthaldehyde. Two cc. of piperidine were added to the solution and a deep red color was formed. After standing in the dark for two days at room temperature, the solution was diluted with 60 cc. of methanol and was then poured into a large volume of agitated ether. A fine yellow precipitate was formed which was filtered off, washed with ether, and dried. The product weighed 11.0 g. It contained the following structural unit to the extent of about 20 mole percent:

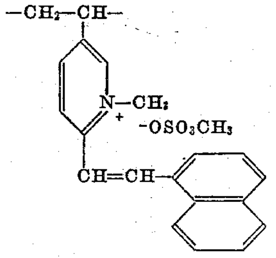

*Example 7.—Condensation of poly-1,2-dimethyl-5-vinylpyridinium methosulfate with p-dimethylaminobenzaldehyde*

To a solution of 10 g. of poly-1,2-dimethyl-5-vinylpyridium methosulfate in 40 cc. of methanol was added 30 g. of p-dimethylaminobenzaldehyde. Two cc. of piperidine were added to the solution, which then turned red. After standing in the dark for two days the solution was diluted with 60 cc. of methanol and poured into a large volume of ether. The red precipitate was washed with ether and dried in a vacuum desiccator. The bright red polymer weighed 15 g. and showed a very high sensitivity to light, its coatings requiring very short exposures to an artificial sunlight lamp to give developed images which were orange-red in color. The product consisted to a large extent of the recurring 4'-dimethylamino-1-methyl-5-vinyl-2-stilbazolium methosulfate structural unit.

In place of the poly-1,2-dimethyl-5-vinylpyridinium methosulfate, there may be substituted in the above example an equivalent amount of any other of the mentioned polymeric quaternary salts, for example, poly-1,2-dimethyl-6-vinylpyridinium methosulfate, or poly-1,2,4-trimethyl-6-vinylpyridinium methosulfate, or poly-1,2-dimethyl-5-vinylpyridinium bromide, or poly-1,2-dimethyl-5-vinylpyridinium p-toluenesulfonate, or a 1:1 copolymer of methyl acrylate and 1,2-dimethyl-5-vinylpyridinium methosulfate, or a 1:1 copolymer of ethylene and 1,2-dimethyl-5-vinylpyridinium methosulfate, or a 1:1 copolymer of acrylamide and 1,2-dimethyl-6-vinylpyridinium methosulfate, or a 1:1 copolymer of styrene and 1,2-dimethyl-5-vinylpyridinium p-toluenesulfonate, etc. to give generally similar light-sensitive stilbazoles that are useful for preparing ink-receptive, resist images.

*Example 8.—Condensation of poly-1,2-dimethyl-5-vinylpyridinium methosulfate with piperonal*

The procedure described in Example 6 was repeated using a solution of 40 g. piperonal dissolved in 15 cc.

of methanol instead of 1-naphthaldehyde. Eleven grams of product were obtained, which when coated on aluminum and exposed to a source of ultraviolet light through a photographic negative, then developed in 2-methoxyethanol, gave a positive image which corresponded to that on the negative. The product contained the 1-methyl-3′,4′-methylenedioxy-5-vinyl-2-stilbazolium methosulfate structural unit to the extent of about 18 mole percent.

*Example 9.—Condensation of poly-1,2-dimethyl-5-vinylpyridinium methosulfate with o-chlorobenzaldehyde*

Fifty grams of o-chlorobenzaldehyde were added to a solution of 10.0 g. of poly-1,2-dimethyl-5-vinylpyridinium methosulfate in 40 cc. of methanol. To this solution were added 5 cc. of piperidine. After standing at room temperature in the dark for 24 hours, the solution was poured into a large volume of ether, and the yellow polymer was filtered off and dried. It weighed 12.6 g. and showed appreciable sensitivity to light. The product contained about 50 mole percent of the 2′-chloro-1-methyl-5-vinyl-2-stilbazolium methosulfate structural unit.

*Example 10.—Condensation of poly-1,2-dimethyl-5-vinylpyridinium methosulfate with furfuraldehyde*

Fifty grams of freshly distilled furfuraldehyde were added to a solution of 10 g. of poly-1,2-dimethyl-5-vinylpyridinium methosulfate in 40 cc. of methanol. Five cc. of piperidine were added, and the solution was allowed to stand two days in the dark. The solution was diluted with 20 cc. of methanol and poured into a large volume of ether. The fibrous polymer was dried at 40° C. and weighed 12.5 g. A coating of this product on a support material on curing, exposing and developing showed appreciable sensitivity to light. The product consisted to the extent of about 80 percent of the recurring structural unit:

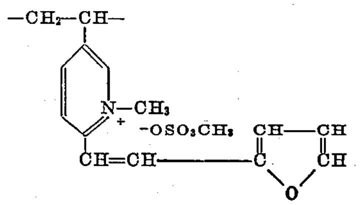

*Example 11.—Copolymerization of 1,2-dimethyl-5-vinylpyridinium methosulfate with styrene*

A mixture of 12.0 g. of 1,2-dimethyl-5-vinylpyridinium methosulfate, 5.2 g. styrene, 0.09 g. benzoyl peroxide and 80 ml. of 95:5 chloroform:methanol was heated under reflux at 60° for 4 hours then allowed to stand at room temperature for three days. The viscous product was slightly hazy, clearing on the addition of a small amount of methanol.

The clear, colorless solution was diluted with methanol and then poured into a large volume of agitated acetone. The white, fibrous precipitate was leached in fresh acetone and dried at 40° C. This product contained 3.2% of nitrogen indicating a molar percentage of 35 of the quaternary constituent in the copolymer.

*Example 12.—Condensation of a copolymer of 1,2-dimethyl-5-vinylpyridinium methosulfate and styrene with anisaldehyde*

Two grams of the copolymer described above was dissolved in a mixture of 10 ml. anisaldehyde and 10 ml. methanol. To this was added 1.0 ml. of piperidine with stirring and the solution stored in the dark at room temperature. After standing six hours in this manner, 1.0 ml. of glacial acetic acid was added to the product and the bright yellow solution was poured into a large volume of agitated ether. The precipitate was redissolved in methanol and again the solution was poured into a large volume of agitated ether. The yellow, fibrous polymer was air dried in the dark at room temperature.

A coating made from a solution of this polymer in methanol when exposed under a photographic half-tone negative and developed in methanol gave a hardened positive image corresponding to the image on the negative.

*Example 13.—Preparation of poly-1,2-dimethyl-5-vinylpyridinium p-toluenesulfonate*

A solution of 11.9 g. of 2-methyl-5-vinylpyridine, 20.5 g. methyl p-toluenesulfonate and 75 ml. of chloroform were refluxed on a steam bath for 24 hours. No viscosity change was observed during this heating, but after standing at room temperature for several hours, a viscous dope had formed. The solution was diluted and precipitated into 3 l. of acetone. The polymer was leached three times with acetone and dried at 40°. Yield 25 g. (82%).

*Example 14.—Condensation of poly-1,2-dimethyl-5-vinylpyridinium p-toluenesulfonate with anisaldehyde*

To a solution of 5 g. of poly-1,2-dimethyl-5-vinylpyridinium p-toluenesulfonate in 20 ml. of methanol was added 25 g. of anisaldehyde followed by 0.85 g. of piperidine. The solution was stored in a dark cupboard for 48 hours, then diluted with 50 ml. of methanol and precipitated into 1 l. of ether. After leaching three times with ether the polymer was dried at room temperature. Yield 4.3 g. It was soluble in 1:1 methyl alcohol-water mixture and insoluble in water. Sensitivity tests on aluminum gave a glass factor of 450.

*Examples 15–19*

Some sensitivity values expressed as glass factors as compared with a standard of 1.0 for unsensitized polyvinyl cinnamate are shown in the following table. All of these sensitivities were obtained on coatings of the respective materials from an 0.75% solution in 50% methyl alcohol-50% water mixture on an aluminum sheet.

TABLE

| Example No. | Reaction Product of Poly-1,2-dimethyl-5-Vinylpyridinium Methosulfate with— | Mole Percent Reaction | Glass Factor |
|---|---|---|---|
| 15 | Benzaldehyde | 25 | 5,500 |
| 16 | Anisaldehyde | 35 | 11,000 |
| 17 | p-Dimethylaminobenzaldehyde | 41 | 2,800 |
| 18 | 1-Naphthaldehyde | 21 | 1,400 |
| 19 | Furaldehyde | 69 | 20,000 |

The column designated "Mole percent reaction" denotes the extent of the reaction of the poly-1,2-dimethyl-5-vinylpyridinium methosulfate with the particular aldehyde. Thus, Example 16 is made up of 35 mole percent of 4′-methoxy-1-methyl-5-vinyl-2-stilbazolium methosulfate units and 65 mole percent of unreacted 1,2-dimethyl-5-vinylpyridinium methosulfate units. The other products shown in the table are to be similarly interpreted.

The polymers of our invention have several very desirable features which make them particularly attractive as far as utility in the fields of photography and the photomechanical reproductive arts. Their high inherent sensitivity to light without the necessity for added sensitizers, reasonably good stability in the dark, and good solubility characteristics are very important in this respect. Furthermore, the polymers being ionic in nature, having a polymeric cation, it is possible to dye the developed images with acid dyes. In certain of these polymers which are already highly colored, for instance, the product described in Example 7 which has an adsorption not only in the ultraviolet region, but well into the visible portion of the spectrum as well, the developed images obtained are readily visible and may not require further treatment with acid dyes.

The polymers of our invention are also capable of forming conducting layers due to their ability to ionize.

It is conceivable that an image of one of these polymers on a strongly non-conducting surface could form the basis of a printing plate which makes use of a differential in electroconductivity on its surface. Thus the non-image areas, uncovered after development, would be capable of taking a static electrical charge, whereas the image areas would not be able to. Treatment of such a differentially charged surface with fusible resin particles of opposite charge would cause adherence of these particles to the non-image areas. These could be fused in place and then transferred to another surface or they may be left in place. If the light-sensitive polymer in such a system were hydrophilic and ink-repellant in nature, then the plate could form as the basis of a positive process.

What we claim is:

1. A light-sensitive polymer selected from the group consisting of a C-vinylpyridine quaternary salt polymer consisting essentially of the recurring structural unit:

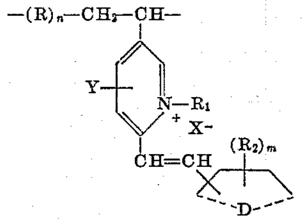

a C-vinylpyridine quaternary salt polymer consisting essentially of the recurring structural unit:

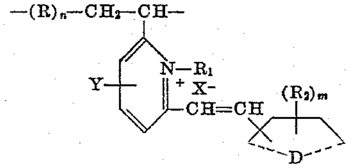

and a C-vinylpyridine quaternary salt polymer consisting essentially of the recurring structural unit:

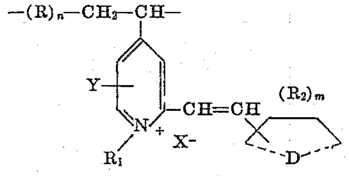

wherein *n* represents a digit of from 0 to 50, *m* represents a digit of from 1 to 2, Y represents a member selected from the group consisting of a hydrogen atom and an alkyl group containing from 1 to 2 carbon atoms, R represents a comonomer unit selected from the group consisting of a methyl acrylate unit, an ethylene unit, an acrylamide unit and a styrene unit, $R_1$ represents an alkyl group containing from 1 to 6 carbon atoms, X represents an anion selected from the group consisting of an alkyl sulfate anion containing from 1 to 6 carbon atoms, an alkyl sulfonate anion containing from 1 to 6 carbon atoms, an aryl sulfonate anion containing from 6 to 7 carbon atoms, a perchlorate anion and a halide anion, $R_2$ represents a member selected from the group consisting of a hydrogen atom, a halogen atom, a methylene dioxy group, an alkyl group containing from 1 to 4 carbon atoms, an alkoxy group containing from 1 to 4 carbon atoms, an acetamido group, a —$COOR_3$ group wherein $R_3$ represents a member selected from the group consisting of a hydrogen atom, an alkyl group containing from 1 to 4 carbon atoms and an alkali metal atom, an —$SO_3R_3$ group wherein $R_3$ is as above, and an

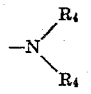

group wherein $R_4$ represents an alkyl group containing from 1 to 4 carbon atoms, and D represents the atoms necessary to complete a carbocyclic nucleus selected from the group consisting of a benzene nucleus and a naphthalene nucleus.

2. A light-sensitive C-vinylpyridine quaternary salt polymer consisting essentially of the recurring structural unit:

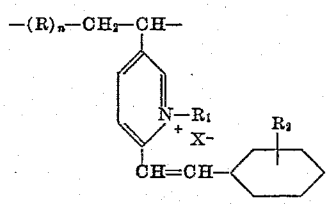

wherein *n* represents a digit of from 0 to 50, R represents a comonomer unit selected from the group consisting of a methyl acrylate unit, an ethylene unit, an acrylamide unit and a styrene unit, $R_1$ represents an alkyl group containing from 1 to 6 carbon atoms, X represents an alkylsulfate anion containing from 1 to 6 carbon atoms, and $R_2$ represents an alkoxy group containing from 1 to 4 carbon atoms.

3. A light-sensitive C-vinylpyridine quaternary salt polymer consisting essentially of the recurring structural unit:

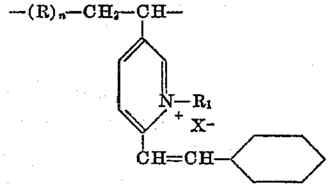

wherein *n* represents a digit from 0 to 50, R represents a comonomer unit selected from the group consisting of a methyl acrylate unit, an ethylene unit, an acrylamide unit and a styrene unit, $R_1$ represents an alkyl group containing from 1 to 6 carbon atoms and X represents an alkylsulfate anion containing from 1 to 6 carbon atoms.

4. A light-sensitive C-vinylpyridine quaternary salt polymers consisting essentially of the recurring structural unit:

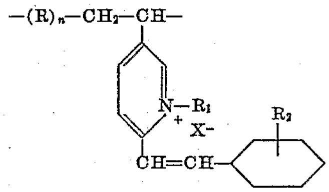

wherein *n* represents a digit from 0 to 50, R represents a comonomer unit selected from the group consisting of a methyl acrylate unit, an ethylene unit, an acrylamide unit and a styrene unit, $R_1$ represents an alkyl group containing from 1 to 6 carbon atoms, X represents an alkylsulfate anion containing from 1 to 6 carbon atoms, and $R_2$ represents a dialkylamino group wherein each of the said alkyl groups contains from 1 to 4 carbon atoms.

5. A light-sensitive C-vinylpyridine quaternary salt polymer consisting essentially of the recurring structural unit:

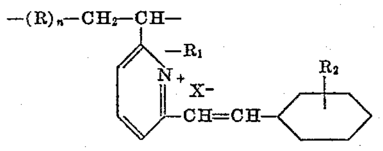

wherein *n* represents a digit from 0 to 50, R represents a comonomer unit selected from the group consisting of a methyl acrylate unit, an ethylene unit, an acrylamide unit and a styrene unit, $R_1$ represents an alkyl group containing from 1 to 6 carbon atoms, X represents an alkylsulfate anion containing from 1 to 6 carbon atoms, and $R_2$ represents an alkyoxy group containing from 1 to 4 carbon atoms.

6. A light-sensitive C-vinylpyridine quaternary salt polymer consisting essentially of the recurring structural unit:

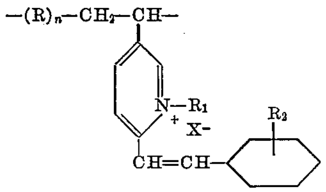

wherein $n$ represents a digit from 0 to 50, R represents a comonomer unit selected from the group consisting of a methyl acrylate unit, an ethylene unit, an acrylamide unit and a styrene unit, $R_1$ represents an alkyl group containing from 1 to 6 carbon atoms, X represents an arylsulfonate anion containing from 6 to 7 carbon atoms, and $R_2$ represents an alkoxy group containing from 1 to 4 carbon atoms.

7. A light-sensitive polymer consisting essentially of the recurring structural unit 4′-methoxy-1-methyl-5-vinyl-2-stilbazolium methosulfate.

8. A light-sensitive polymer consisting essentially of the recurring structural unit 1-methyl-5-vinyl-2-stilbazolium methosulfate.

9. A light-sensitive polymer consisting essentially of the recurring structural unit 4′-dimethylamino-1-methyl-5-vinyl-2-stilbazolium methosulfate.

10. A light-sensitive polymer consisting essentially of the recurring structural unit 4′-methoxy-1-methyl-6-vinyl-2-stilbazolium methosulfate.

11. A light-sensitive polymer consisting essentially of the recurring structural units styrene and 4′-methoxy-1-methyl-5-vinyl-2-stilbazolium p-toluenesulfonate.

12. A process for preparing a light-sensitive C-vinylpyridine quaternary salt polymer which comprises reacting a light-insensitive C-vinylpyridine quaternary salt polymer selected from the group consisting of those represented by the general formulas:

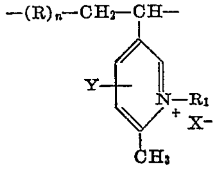

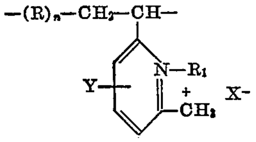

and

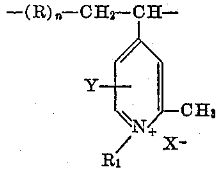

wherein $n$ represents a digit of from 0 to 50, Y represents a member selected from the group consisting of a hydrogen atom and an alkyl group containing from 1 to 2 carbon atoms, R represents a comonomer unit selected from the group consisting of a methyl acrylate unit, an ethylene unit, an acrylamide unit and a styrene unit, $R_1$ represents an alkyl group containing from 1 to 6 carbon atoms, X represents an anion selected from the group consisting of an alkyl sulfate anion containing from 1 to 6 carbon atoms, an alkyl sulfonate anion containing from 1 to 6 carbon atoms, an aryl sulfonate anion containing from 6 to 7 carbon atoms, a perchlorate anion and a halide anion, with an aromatic aldehyde represented by the general formula:

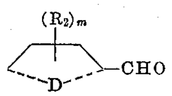

wherein $m$ represents a digit of from 1 to 2, $R_2$ represents a member selected from the group consisting of a hydrogen atom, a halogen atom, a methylene dioxy group, an alkyl group containing from 1 to 4 carbon atoms, an acetamido group, a —$COOR_3$ group wherein $R_3$ represents a member selected from the group consisting of a hydrogen atom, an alkyl group containing from 1 to 4 carbon atoms and an alkali metal atom, an —$SO_3R_3$ group wherein $R_3$ is as above defined, and an

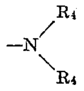

group wherein $R_4$ represents an alkyl group containing from 1 to 4 carbon atoms, and D represents the atoms necessary to complete a carbocyclic nucleus selected from the group cosisting of a benzene nucleus and a naphthalene nucleus, in an alkanol reaction medium, in the proportions of from 1 to 40 moles of the said aromatic aldehyde to each mole of the said light-insensitive polymer.

References Cited in the file of this patent

UNITED STATES PATENTS

| | | |
|---|---|---|
| 2,255,077 | Middleton | Sept. 9, 1941 |
| 2,612,446 | Umberger | Sept. 30, 1952 |

OTHER REFERENCES

Doja et al.: Jour. Indian Chem. Soc., vol. 23, pages 117–120. (Copy available in Sci. Lib.)